United States Patent
Kenington

(10) Patent No.: US 8,831,684 B2
(45) Date of Patent: Sep. 9, 2014

(54) BASE TRANSCEIVER STATION WITH RADIATION BEAM STEERING AND ACTIVE ANTENNA

(75) Inventor: Peter Kenington, Chepstow (GB)

(73) Assignee: Kathrein-Werke KG, Rosenheim (DE)

( * ) Notice: Subject to any disclaimer, the term of this patent is extended or adjusted under 35 U.S.C. 154(b) by 0 days.

(21) Appl. No.: 12/951,223

(22) Filed: Nov. 22, 2010

(65) Prior Publication Data

US 2012/0129575 A1    May 24, 2012

(51) Int. Cl.
| | | |
|---|---|---|
| *H04M 1/00* | (2006.01) |
| *H04W 24/00* | (2009.01) |
| *H04B 1/02* | (2006.01) |
| *H01Q 3/26* | (2006.01) |
| *H01Q 1/24* | (2006.01) |
| *H04B 7/06* | (2006.01) |
| *H04W 24/02* | (2009.01) |
| *H04W 16/28* | (2009.01) |

(52) U.S. Cl.
CPC ............ *H04W 24/02* (2013.01); *H01Q 3/2605* (2013.01); *H01Q 1/246* (2013.01); *H04W 16/28* (2013.01); *H04B 7/0617* (2013.01)
USPC .................. 455/562.1; 455/456.1; 455/456.5; 367/138

(58) Field of Classification Search
CPC ..... H04W 16/28; H04W 24/02; H04W 64/00; H04W 16/00; H04W 16/24; H04W 52/143; H04W 52/283; H04W 72/0473; H01Q 1/246; H01Q 3/08; H01Q 3/005; H01Q 3/32; H01Q 1/125; H01Q 3/04; H01Q 3/2676; H04B 7/0617; H04B 7/0619; H04B 7/086; H04B 7/0408
USPC ...................... 455/456.1–457, 562.1; 367/138
See application file for complete search history.

(56) References Cited

U.S. PATENT DOCUMENTS

| | | | | |
|---|---|---|---|---|
| 5,008,680 A | * | 4/1991 | Willey et al. .................. 342/372 |
| 5,223,845 A | * | 6/1993 | Eguchi .......................... 342/359 |
| 5,365,239 A | * | 11/1994 | Stilwell, Jr. ................... 342/368 |
| 6,282,434 B1 | * | 8/2001 | Johannisson et al. ...... 455/562.1 |
| 6,366,237 B1 | * | 4/2002 | Charles ......................... 342/368 |
| 6,510,312 B1 | * | 1/2003 | Lempiainen .................. 455/101 |
| 7,120,431 B1 | * | 10/2006 | Huo et al. ..................... 455/423 |
| 7,236,808 B2 | * | 6/2007 | Goldberg ..................... 455/562.1 |
| 7,280,803 B2 | * | 10/2007 | Nelson ........................ 455/67.11 |
| 7,515,874 B2 | * | 4/2009 | Nikolajevic et al. ......... 455/41.2 |
| 7,639,196 B2 | * | 12/2009 | Elliot et al. .................. 343/757 |
| 8,018,390 B2 | * | 9/2011 | Davidson et al. ............ 343/754 |
| 8,611,886 B2 | * | 12/2013 | Ho et al. .................... 455/422.1 |
| 2002/0094823 A1 | * | 7/2002 | Suzuki et al. ................. 455/456 |

(Continued)

*Primary Examiner* — Matthew Sams
(74) *Attorney, Agent, or Firm* — Stephen H. Eland; Dann, Dorfman, Herrell & Skillman

(57) ABSTRACT

A base transceiver station for a mobile communications network for communicating with a plurality of subscriber devices within a coverage area comprises an active antenna array with a tilt adaption arrangement to adjust a vertical tilt angle of an antenna beam in dependence of beam tilting control data, and thereby dynamically change the coverage area served by the base transceiver station. The base transceiver station further comprises a beam control device for evaluating the distance of the subscriber devices in the coverage area to the active antenna array and calculating from the distances the beam tilting control data. As the distance of a subscriber device to the antenna is a parameter that may be extracted directly from data that is available anyhow for at least some subscriber devices, this data can be acquired at no extra expense.

13 Claims, 4 Drawing Sheets

(56) References Cited

U.S. PATENT DOCUMENTS

| | | | |
|---|---|---|---|
| 2004/0038687 A1* | 2/2004 | Nelson | 455/456.1 |
| 2004/0048635 A1* | 3/2004 | Goldberg | 455/562.1 |
| 2004/0135723 A1* | 7/2004 | Nakaya et al. | 342/372 |
| 2005/0207362 A1* | 9/2005 | Wenzel et al. | 370/296 |
| 2005/0250542 A1* | 11/2005 | Aoyama et al. | 455/562.1 |
| 2005/0272472 A1* | 12/2005 | Goldberg et al. | 455/562.1 |
| 2006/0084474 A1* | 4/2006 | Iacono et al. | 455/562.1 |
| 2006/0183503 A1* | 8/2006 | Jeffrey Goldberg | 455/561 |
| 2006/0293043 A1* | 12/2006 | Aoyama | 455/422.1 |
| 2007/0054617 A1* | 3/2007 | Nikolajevic et al. | 455/41.2 |
| 2007/0160012 A1* | 7/2007 | Liu | 370/334 |
| 2007/0161348 A1* | 7/2007 | Gribben et al. | 455/13.3 |
| 2009/0143018 A1* | 6/2009 | Anderson et al. | 455/67.11 |
| 2009/0295648 A1* | 12/2009 | Dorsey et al. | 343/702 |
| 2010/0231473 A1* | 9/2010 | Shtrom et al. | 343/757 |
| 2011/0053647 A1* | 3/2011 | Oyama | 455/562.1 |
| 2011/0070822 A1* | 3/2011 | Schlee et al. | 455/17 |
| 2014/0135026 A1* | 5/2014 | Hamada et al. | 455/452.1 |

* cited by examiner

BASE TRANSCEIVER STATION WITH RADIATION BEAM STEERING AND ACTIVE ANTENNA

CROSS-REFERENCE TO RELATED APPLICATIONS

None

FIELD OF THE INVENTION

This field of the present disclosure relates in general to a base transceiver station and an active antenna array. In particular, the field of the present disclosure relates to the steering of a radio beam from the active antenna array connected to a base transceiver station in a mobile communications network and thus dynamically change a coverage area served by the radio beam.

BACKGROUND OF THE INVENTION

The use of mobile communications networks has increased over the last decade. Operators of the mobile communications networks have increased the number of base transceiver stations in order to meet an increased demand for service by users of the mobile communications networks. Scarcity of available frequencies has always been an issue. Frequencies have to be re-used in other cells. A certain distance between cells using the same frequency in some mobile communications protocols has to be kept in mind to avoid interference between radio signals being transceived, which decreases signal quality.

One way of improving the signal quality is to use steered adaptive antenna systems in which individual ones (or groups) of subscriber devices are tracked both in azimuth and elevation. In other words, a radio beam from the adaptive antenna systems of the art tries to follow the subscriber devices and concentrates the power of the radio beam on the tracked ones of the subscriber devices. This tracking requires quite a lot of hardware and software resources and may furthermore lead to other ones of the subscriber devices, for example situated at the edge of a coverage area, being "ignored" by the adaptive antenna system leading to a reduction in quality of the radio signal and even to non-reachability or dropping of a call.

The term "base transceiver station (BTS)" in the context of this disclosure includes, but is not limited to, base stations, as known from GSM networks, as well as a node B (known from UMTS/3G networks) or enhanced node B, and similar units used in other mobile communication network.

The term "subscriber device" in the context of this disclosure is intended to encompass all types of mobile stations and other devices connected to the mobile communication network. Such subscriber devices can be portable or stationary. For example wireless modules can be incorporated into vending machines for the transceiving of data over the mobile communication network. Such wireless modules are also considered to be subscriber devices.

SUMMARY OF THE INVENTION

It is an aspect of the teachings of this application to provide a base transceiver station for a mobile communication network for communicating with a plurality of subscriber devices within a coverage area. The base transceiver station comprises an active antenna array and the active antenna array comprises a tilt adaption arrangement to electronically adjust a vertical tilt of an antenna beam in dependence of beam tilting control data and thus dynamically—in substantially real time—adjust the size of the coverage area.

The base transceiver station further comprises a beam control device for evaluating a distance from the subscriber devices in the coverage area to the active antenna array and calculating from the distances the beam tilting control data. The distance from the subscriber devices to the active antenna array is a parameter that may be extracted directly from available data for at least some subscriber devices and, as a result, this data about the distance can be acquired at no extra expense. The relation between the distance of the subscriber device to the active antenna array and a corresponding tilt angle of an antenna beam of the active antenna array that covers the subscriber device is a very simple calculation that does not require a lot of additional calculating power or software code. The beam tilting control data is intended to adapt the size of the coverage area to reflect the location of one or more subscriber devices served by the active antenna array. For example the change in the vertical tilt angle enables the coverage area to be reduced or expanded when groups of users of the subscriber devices move through the coverage area served by the base transceiver station. It will be appreciated that the change in the vertical tilt angle does not mean that a radio beam will "follow" the groups in a horizontal direction.

The active antenna array may also comprise, in addition to the electronic tilt adaption arrangements, electro-mechanical beam tilting devices, i.e. utilizing motors to pre-tilt the antenna. The term tilting is used in this disclosure in connection with the electronic tilt adaption arrangements, if not clearly stated otherwise. The terms "tilt adaption arrangement", "beam control device", and "beam tilting control data" similarly refer in the same manner only to the electronic tilting of an antenna beam.

Another aspect of the teachings of this disclosure is that the beam control device evaluates at least one of geo-location data received from the plurality of subscriber devices, round-trip delay data of signals to/from the plurality of subscriber devices, or positioning data that is received from the plurality of subscriber devices (e.g. by means of an in-built GPS receiver within the subscriber device). The geo-location data, or the round-trip-delay, or the positioning data is included in the data sent from a subscriber device to the base transceiver station or is calculated anyhow by the base transceiver station. This data is thus easy to acquire and suffices for the purpose of reducing the interference in a given area.

The base transceiver station comprises receivers for receiving the radio signals of at least one subscriber device and for down-converting and demodulating the received radio signals into digital data. The base transceiver station also comprises transmitters for modulating and up-converting the digital signals to form the radio signals to be transmitted to the subscriber device. The base transceiver station is the unit in the mobile communications network that is located close to the active antenna array at which data received from the subscriber devices is available in digital form. This data received from the subscriber devices can be used to evaluate a necessary beam coverage area. The evaluation is done very close to the antenna in terms of system hierarchy and the data does not have to be sent to another, more centralized unit in the mobile communication network. In this manner the data transfer within the mobile communication network does not increase.

Another aspect of the present disclosure is that radio signals are transceived in one or more time slots and the beam tilt adaption arrangement generates the beam tilting control data for the one or more time slots. Thus the antenna beam can be tilted separately for each subscriber device in the coverage area. Usually not all of the subscriber devices are on the outer margin of the coverage area, but are closer to the base station. Each time a beam is tilted for the duration of a time slot because a subscriber device is not in the outer margin of a coverage area (also termed footprint), the down-tilted beam is limited for the duration of that time slot, in its propagation, to a smaller area.

For subscriber devices closer to the active antenna array the down-tilted beam will still reach the subscriber devices, but the coverage area or footprint, i.e. the area over which the beam is radiating, is limited in its size. The portion of the transmit signal resulting from the down-tilted beam that extends into a neighboring cell and can be measured in a neighboring cell (i.e. with overlapping footprints) is thus reduced in comparison to the portion of the transmit signal that would be measured in a neighboring cell for the non-tilted beam. The transmit frequency of a down-tilted transmit beam will not thereby interfere, or at least substantially less interfere, in the given time slot with the receiving frequencies of other ones of the subscriber devices in the neighboring cell.

It should be noted that in the context of this disclosure, the term: 'neighbouring cell' is intended to refer to a nearby cell utilizing some or all of the same frequencies as the original cell and not necessarily a cell which is immediately, geographically, adjacent. In many cellular systems, such as those operating as a GSM network, frequencies are not re-used in an immediately adjacent cell but in a cell which is one cell footprint further from the original cell, i.e. there is a cell, using a different set of frequencies between the original cell and the 'neighbouring cell'. In other cellular systems, such as most CDMA based networks, frequencies are re-used in geographically adjacent cells, so both possibilities are present in modern mobile communications networks.

The beam tilting control data is calculated in the base transceiver station for one of the cells, independently of the neighboring cell. The interference in a neighboring cell between a transmit beam and a receive beam will be improved without the need of exchanging information between the base transceiver stations serving the different ones of the neighboring cells for the purpose of improving the overall network interference. This exchange of information would require a centralized entity in the mobile communications network, such as a base station controller, which might add to overhead and complexity of the mobile communications network, or at least increase the data traffic required to be transported by the core network.

Another aspect of the present disclosure is that the beam control device calculates power modification factors for reducing power of the transmit beam. It will be recalled that a tilted antenna beam is concentrated on a smaller footprint. The transmit signal in the beam will arrive at the subscriber device at a higher level than necessary to meet a specific minimum signal quality. The power levels for the transmit signals are calculated in the base station controller. The calculated power level does not take into account the smaller footprint of the tilted antenna beam. With an appropriate power modification factor, that is used to reduce the power level of the signals emanating from the active antenna system, the signal power of the transmit signal arriving at the subscriber device can be adapted accordingly.

A reduction of the power level can also be applied in a TDMA cellular system on a per time slot basis for each time the beam control device decides to down-tilt the transmit beam. The reduction of the power level improves the interference situation in neighboring ones of the cells. This enables a further contribution to the improvement of the overall interference between adjacent ones of the cells in the mobile communications network.

Another aspect of the teachings of this disclosure is that the active antenna array comprises an interface to receive the beam tilting control data from a beam control device located remotely to the active antenna array. In base transceiver stations which control the active antenna arrays, the beam control device can be located in the base transceiver station equipment rack. This interface can also be used for receiving the power modification factors for each time slot.

Another aspect of the teaching of this disclosure is that the active antenna array is an active antenna array comprising radio units for receiving and transmitting the radio signals, wherein the beam control device is located in the active antenna array. As the micro radio units down-convert and demodulate the received radio signals into digital data, a beam control device can evaluate the digital data directly in the active antenna array.

Another aspect of the teaching of this disclosure is that the beam tilting may be used either in downlink, i.e. for transmitting from the base station to the subscriber devices, or in uplink, i.e. for receiving the signals of each subscriber device at the base transceiver station or for both, up-link and down-link.

Another aspect of the teaching of this disclosure is a chip set for the base transceiver station.

DETAILED DESCRIPTION OF THE INVENTION

The invention will now be described on the basis of the drawings. It will be understood that the embodiments and aspects of the invention described herein are only examples and do not limit the protective scope of the claims in any way. The invention is defined by the claims and their equivalents. It will be understood that features of one aspect or embodiment of the invention can be combined with a feature of a different aspect or aspects and/or embodiments of the invention.

Figure 1:
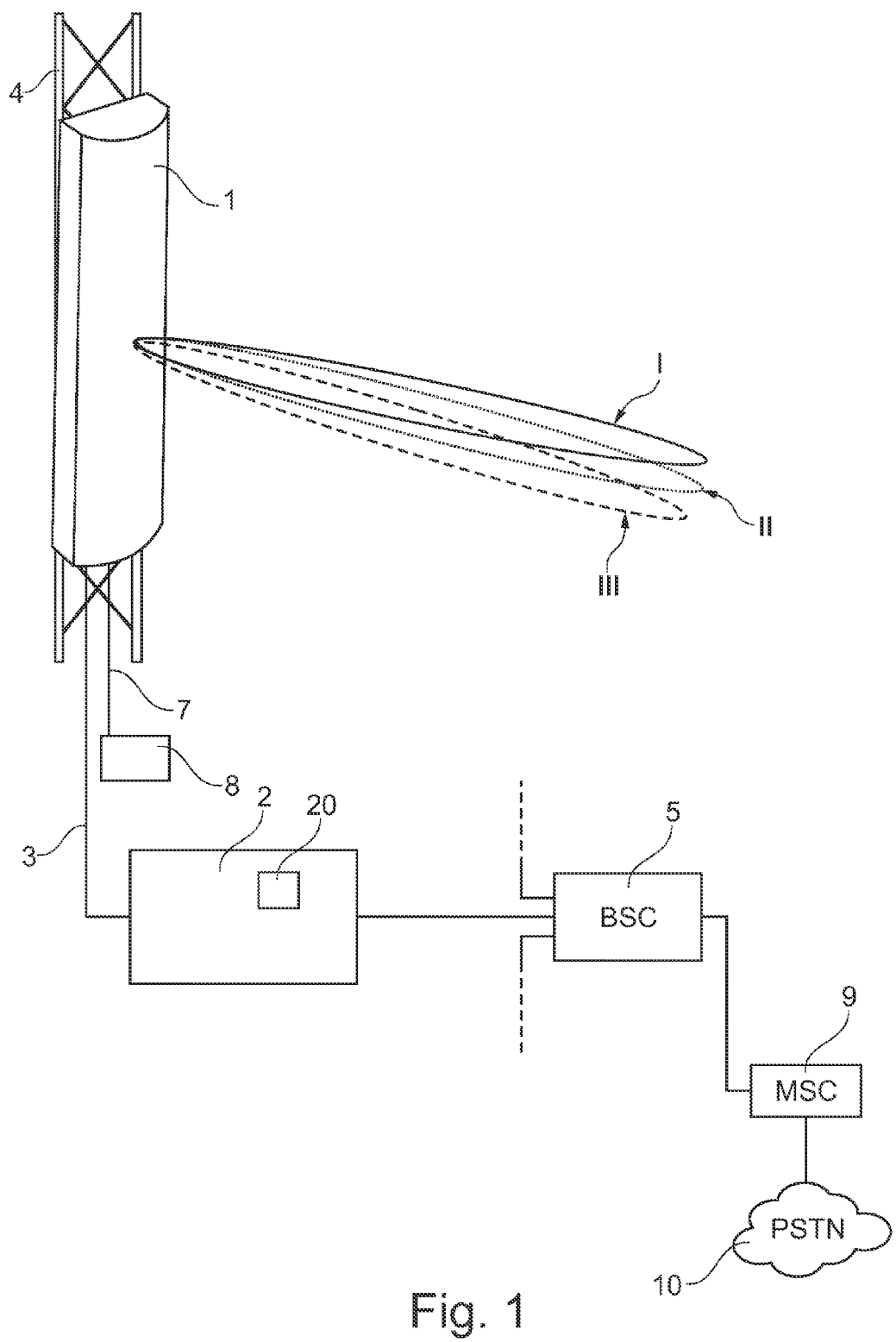
FIG. 1 shows a first aspect of the base station according to the present disclosure.

FIG. 1 shows a first aspect of the present disclosure with a base station for a mobile communications network using the TDMA protocol, comprising an active antenna array 1 and a base station equipment rack 2. It will be appreciated that the concepts presented in the present disclosure may also be used for one of the mobile communications networks using another protocol, such as the GSM protocol and the CDMA protocol.

The active antenna array 1 exchanges all payload signals and control signals with the base station equipment rack 2 in digital form. The payload signals and the control signals can be exchanged via a fibre optic cable 3 up to 40 km in length. Thus the base station equipment rack 2 can be located in a remote place. Only a power supply cable 7 has to supply the active antenna array 1 with power from a close by power supply unit 8. In the event that the base station equipment rack 2 is also very close to the active antenna array 1, the power supply unit 8 may also be incorporated in the base station equipment rack 3. In the aspect of the present disclosure the base station equipment rack 3 is connected to a base station controller 5. The base station controller 5 typically is connected to tens or even hundreds of the base stations.

From a hierarchical view the base station controller 5 is an instance in the mobile communications system that adds networking functionality to the mobile communications system. The base station controller 5 handles complex tasks that at least include or affect neighbouring ones of the base stations, such as but not exclusively signal quality measurements, allocation of radio channels, and hand-over when a subscriber device passes from one coverage area of a first base station to a coverage area of another one of the base stations. Several base station controllers 5 are connected to a mobile switching center 9. The mobile switching center 9 connects the mobile communication network to a public telephone switching network 10 or other data transmission network. The structure of the illustrated mobile communication network is a non-limiting example and relates to a cellular network. The person skilled in the art will appreciate that the present disclosure is applicable to all kinds of mobile telecommunication networks such as, but not limited to, mobile telecommunications networks operating one or more of the TDMA, CSMA, GSM or UTRAN protocols. The person skilled in the art will appreciate that units in other mobile communication networks despite a comparable function may be termed differently. For example a base station controller in UTRAN is usually termed a radio network controller RNC.

The active antenna array 1 is attached to a mast 4 in order to be placed above of all of the subscriber devices that are served in the coverage area. Usually the active antenna array 1 is mounted such that a radio beam that is emitted from the active antenna array 1 is tilted slightly downwards at a fixed tilt angle. Due to the downward tilted beam the radiation of the radio beam into the neighbouring coverage areas is naturally limited. The fixed tilt angle is, however, chosen that the radio beam is able to serve subscriber devices at the edge of the coverage area. This fixed tilt angle may be achieved by spacers when mounting the active antenna array 1 to the mast 4 or by electro-mechanical devices that allow the change of the tilt angle to a specific value. The tilt angle that is set mechanically or electro-mechanically in the active antenna arrays 1 described in this disclosure and is intended to be kept at this tilt angle for a longer period of time (e.g. minutes, hours, days, months, or even years) will be termed "pre-tilted angle". Depending upon the size of the cell and the elevation of the active antenna array 1 above ground level, pre-tilted angles of between 3° and 10° are common, but this may vary depending on the conditions present in the cell. A calculation of the pre-tilted angle may be made using local knowledge and/or a network-planning tool.

Figure 2A:
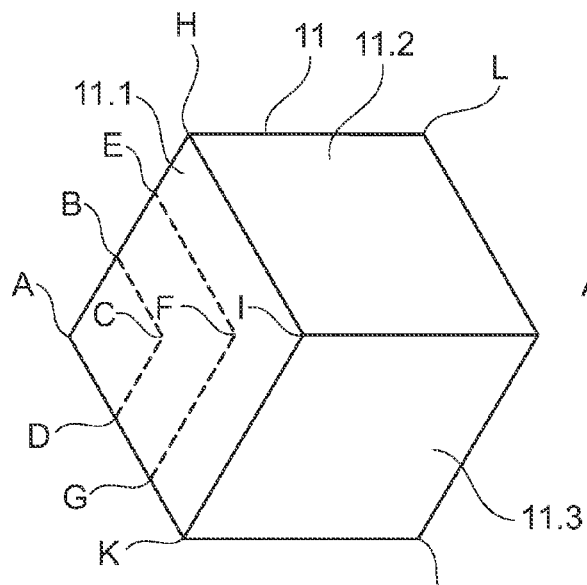
FIGS. 2a-2d show a coverage area of the base station according to the present disclosure.
Figure 2B:
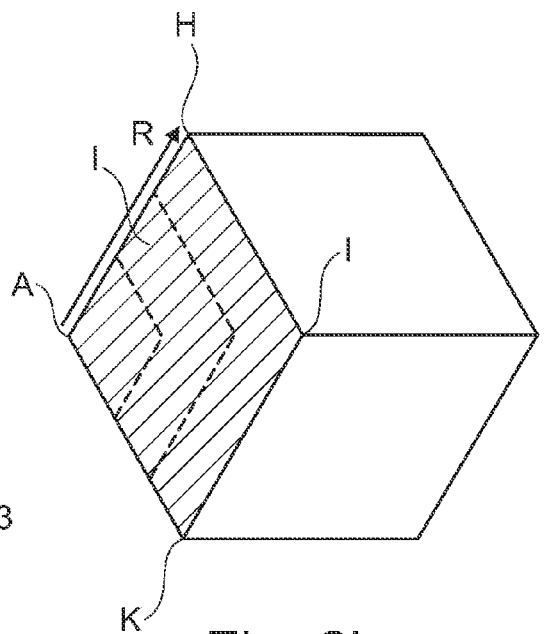

In an aspect of the present disclosure FIG. 2a shows a cell 11 of the mobile communications network that is divided into three coverage areas, a first cell sector 11.1, a second cell sector 11.2 and a third cell sector 11.3. Each one of the cell sectors 11.1, 11.2, and 11.3 is served by an active antenna array 1 which is placed on the outside A, L, M of the cell 11. The base station of the present disclosure is for example placed at a corner A of the first sector 11.1 and covers the whole of the first sector 11.1. In FIG. 2b this coverage area I is symbolically depicted as a diamond shape with four corners A, H, J, K.

The active antenna array 1 in the present disclosure is equipped with an electronic arrangement for tilting the radio beam downwards along a vertical axis from an upper most plane I. Radio beam tilting can be achieved for example by a plurality of separate antenna elements and separate micro radio units, which change the amplitude, phase or delay (or suitable combination of these parameters) of the different components of the radio signals, as is known from the Applicant's co-pending applications. By means of this adjustment of the different components each one of the antenna signal components is phase shifted and/or time shifted and/or attenuated relative to the other ones of the antenna signal components, and a certain shape or tilt angle for the overall radiation pattern of the active antenna array 1 can be achieved. The tilting downwards along the vertical axis changes the size of the coverage area. This technique as well as other techniques to generate tilted radio beams are well-known to the person skilled in the art and therefore will not be further described in detail here. However, it will be appreciated that the person skilled in the art will have to choose one of the techniques that switches fast enough between the desired tilt angles. In the TDMA cellular network the switching between the desired tilt angles can take place on a per-time slot basis. In other types of cellular networks the switching is carried out when switching between subscriber units or groups of subscriber units.

The active antenna array 1 comprises an interface for receiving beam tilting control data. According to the beam tilting control data the radio beam is tilted down by certain angle, for example by 3° for a first value, and by 5° for a second value in addition to the pre-tilted angle. FIG. 1 shows the non-tilted beam I, a half tilted beam II and a fully tilted beam III. The person skilled in the art will appreciate that any number of tilting angles may be generated, and the radio beam may be steered in a continuous angle instead of a series of discrete steps and that the three different beams in FIG. 1 are just an example.

Figure 2C:
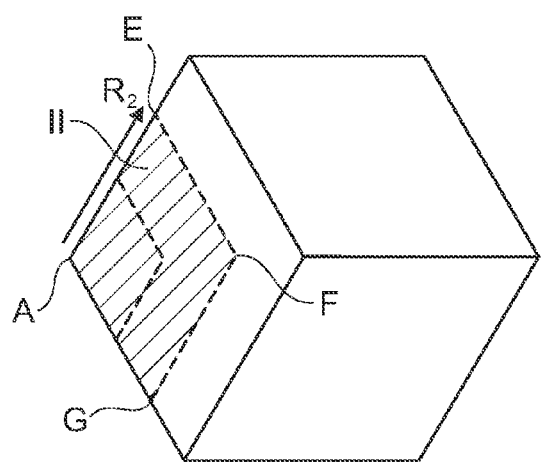
Figure 2D:
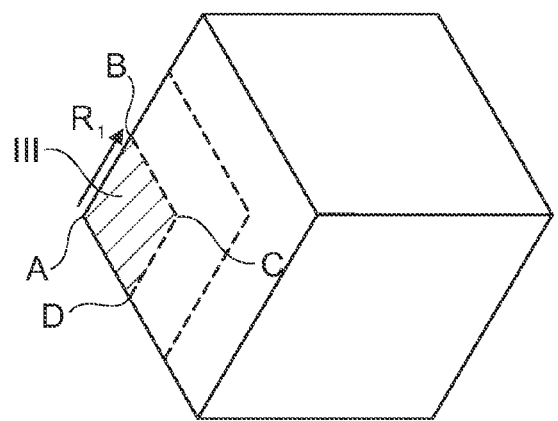

FIG. 2b shows a first coverage area of the radio beam I that covers the full first sector A, H, J, K. The maximum extension of the first cell sector 11.1 from the antenna site A to the most distant cell border H-J-K may be described by a cell radius R. FIG. 2c shows a second coverage area II when the radio beam is tilted at a smaller angle. The diamond shaped coverage area extends from the antenna site A to an area spanned approximately by corners A, E, F, G and covers a smaller area than the full first cell sector 11.1. Consequently a second cell radius $R_2$ may be used to describe the smaller size of the first cell sector 11.1 caused by the tilted beam at the smaller angle. Finally FIG. 2d shows a third coverage area III for a further tilted beam III that extends from the site of the active antenna only to corners B, C, D. The size of this smallest cell sector generated by the tilted beam III can be described with a first radius $R_1$. The person skilled in the art will appreciate that the hexagonal shape of a cell 11, and the diamond shapes of the first cell sector 11.1 as well as cell radius R, $R_1$, $R_2$ are mental constructions for cell organisational purposes and do not correspond to an actual shape and size of the cell or the cell sector. In reality all of the actual shapes and sizes are influenced by many parameters and objects such as buildings which form obstacles in the radio field and therefore to the cells 11. The first coverage area I, the second coverage area II and the third average area III are, in practice, shaped irregularly.

Figure 5:
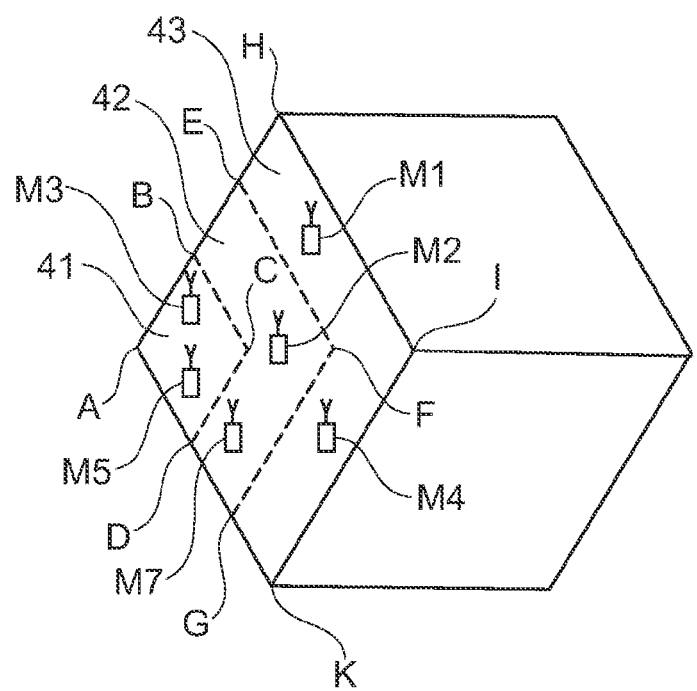
FIG. 5 shows yet another aspect of the base station according to the present disclosure.

FIG. 5 shows the cell 11 of mobile communications networks with the first cell sector 11.1 and a first subscriber device M1, a second subscriber device M2, a third subscriber device M3, a fourth subscriber device M4, a fifth subscriber device M5 and a seventh subscriber device M7 inside the first cell sector 11.1. In this aspect of the present disclosure the first cell sector 11.1 is divided in a near field area 41 delimited by the corners A-B-C-D, a middle field area 42 delimited by the corners B-E-F-G-D-C and a far field area 43 delimited by the corners E-H-J-K-G-F. The first subscriber device M1 and the fourth subscriber device M4 are in the far field area 43, the second subscriber device M2 and the fourth subscriber device M4 are in the middle field area 42 and the third subscriber device M3 and the seventh subscriber device M7 are in the close field area 41.

Figure 4:
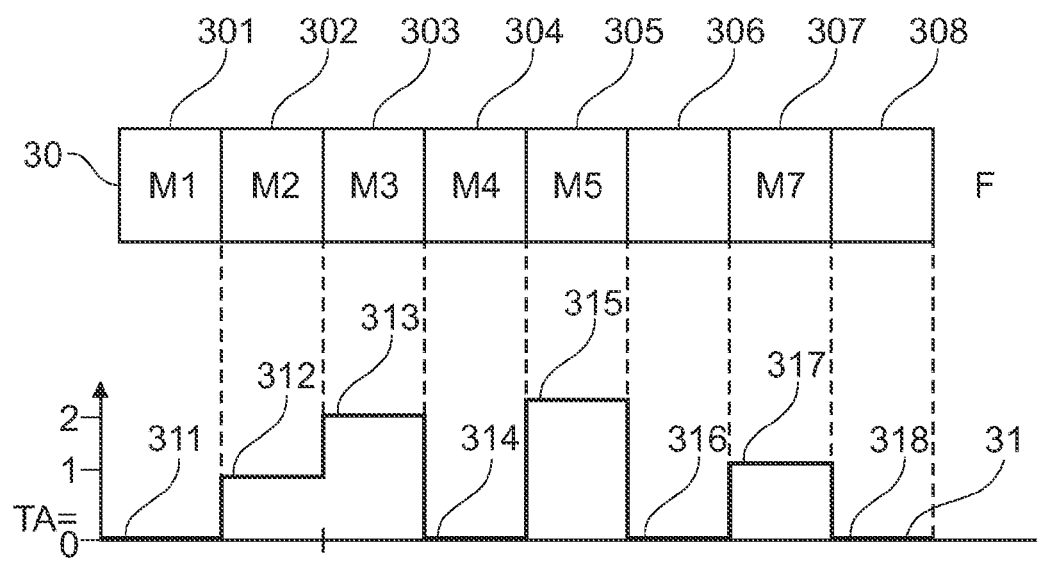
FIG. 4 shows yet another aspect of the base station according to the present disclosure.

As the mobile communications network of the aspect of the disclosure operates using the TDMA protocol, all of the radio signals to be transmitted to the first subscriber device M1, the second subscriber device M2, the third subscriber device M3, the fourth subscriber device M4, the fifth subscriber device M5 and the seventh subscriber device M7 and to be received from the first subscriber device M1, the second subscriber device M2, the third subscriber device M3, the fourth subscriber device M4, the fifth subscriber device M5 and the seventh subscriber device M7 are arranged in a time frame 30 as depicted in FIG. 4. In the present disclosure the time frame comprises a first time slot 301, a second time slot 302, a third time slot 303, a fourth time slot 304, a fifth time slot 305, a sixth time slot 306, a seventh time slot 307 and an eight time slot 308. In the first time slot 301 signals for the first subscriber device M1 are located, in the second timeslot 302 signals for the second subscriber device M2 are located, in the third timeslot 303 signals for the third subscriber device M3 are located, in a fourth timeslot 304 signals for the fourth subscriber device M4 are located, in a fifth timeslot 305 signals for the fifth subscriber device M5 are located, in the sixth time slot no signal is present, in a seventh timeslot 307 the seventh signal for the seventh subscriber device M7 is located and in the eighth time slot 308 no signal is transmitted in the down link.

In one aspect of the present disclosure the subscriber devices M1 . . . M7 regularly send location related data such as geo-location data or position data, i.e. coordinates of their actual position, to the base station 1, 2. This location-related data is forwarded from the base station 1, 2 to the base station controller 5 and is therefore accessible in the base station 1, 2.

In a second aspect of the present disclosure, the base station 1, 2 or the base station controller 5 is equipped with a geolocation capability. This geolocation capability is able to determine the location of the subscriber device based upon information that the geolocation capability receives from the base-station 1,2 or the base-station controller. One example could be information about a sector from which the mobile signals are being received. Another example would be extracting the information from the subscriber device information, for example signal quality measurements, round trip delay measurements etc. This latter form of the geolocation capability is in current use in the base station systems in the USA, for locating emergency callers (so-called 'E911 geolocation').

There is a fixed correlation between the frequencies and time slots that the base station 1, 2 is using for transmitting the transmit signals to, and receiving the receive signals from, a subscriber device. The beam control device 20 has not only full access to these transmit signals and these receive signals but also is enabled to allocate in pairs the transmit signal and the receive signal of each specific subscriber device. Thus the beam control device 20 is enabled to attribute the location-related data received on a specific receive frequency and specific time slot to a corresponding transmit frequency and a specific time slot for a specific subscriber device M1 . . . M7. Due to its location in the active antenna array 1 or the base station equipment rack 2 the beam control device 20 is enabled to fulfil its task autonomously and does not need any further information, that might be available only in a remote entity, such as in the base station controller.

Figure 3:
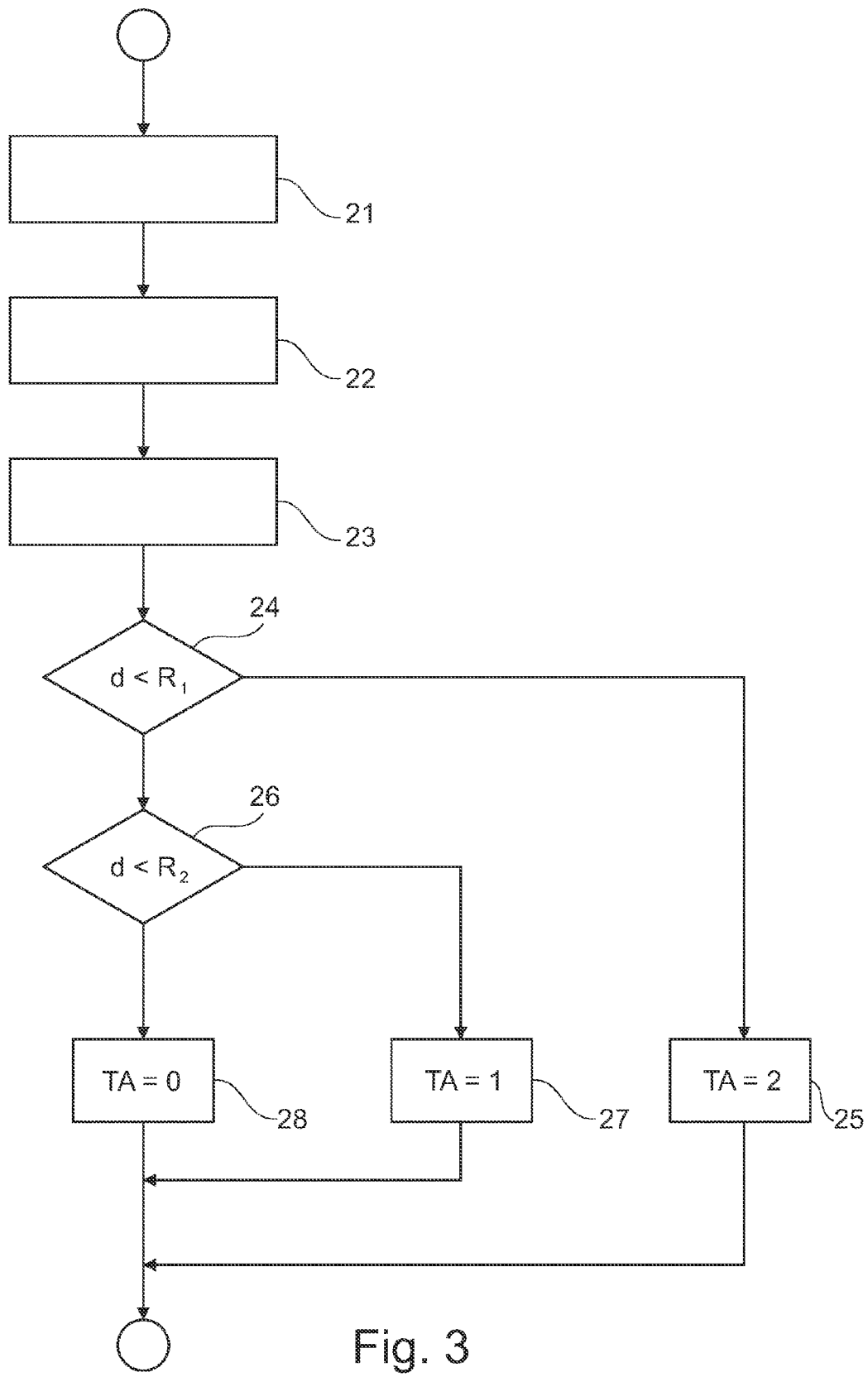
FIG. 3 shows yet another aspect of the base station according to the present disclosure.

FIG. 3 shows how the beam control device 20 calculates the beam control data. The beam control device 20 is, for example, located either in the active antenna array 1 or in the base station equipment rack 2. In one aspect of the present disclosure. The beam control device 20 is implemented in a software program that is using the calculating power of a control processor that is available in the active antenna array 1 or the base station equipment 2. According to the available resource, the beam control device 20 may be allocated to a dedicated processor or even a hardware circuit (such as a PLA or FPGA). The beam control device 20 repeats a series of steps for each of a subscriber device M1 . . . M7 during a time frame 30. In a first step 21 the beam control device 20 selects a specific subscriber device, starting with, for example, the first subscriber device M1 in the time frame 30. In a second step 22 the beam control device 20 collects the location-related data for the selected subscriber device M1. In a third step the control device 20 calculates the distance d between the position of the active antenna array 1 and the first subscriber device M1 based on the location-related data collected in the second step 22. As the active antenna array 1 is usually immobile, the position and geo-location coordination of the active antenna array 1 are well-known and stored as a fixed value in the base station equipment rack 2. The distance d can be easily calculated from the coordinates $A_x$, $A_y$ of the site of the active antenna array 1 and the coordinates $M_x$, $M_y$ of the subscriber device M1 by the following formula:

$$d=\sqrt{(A_x-M_x)^2+(A_y-M_y)^2}$$

In a fourth step 24 this distance d is compared with the first radius $R_1$ of the cell. If the distance d is less than the first radius $R_1$ of the first cell sector 11.1 a tilt angle parameter TA is assigned in a fifth step 25 the value "2". In the event the distance d is larger than the first radius $R_1$ then the distance d it is compared in a sixth step 26 with a second radius $R_2$. In the event the distance d of the subscriber device M1 is in between the first radius $R_1$ and the second radius $R_2$ the tilt angle parameter TA is assigned in a seventh step 27 the value "1". Finally if both comparisons failed that means that the distance d is greater or equal to the second radius $R_2$ and in an eight step 28, the tilt angle parameter is assigned the Value "0". These steps are repeated for each one of the subscriber devices in a time frame 30. In this manner the tilt angle parameters TA are generated for each of the first subscriber device M1, the second subscriber device M2, the third subscriber device M3, the fourth subscriber device M4, the fifth subscriber device M5 and the seventh subscriber device M7 dependent upon the distance d of the first subscriber device M1, the second subscriber device M2, the third subscriber device M3, the fourth subscriber device M4, the fifth subscriber device M5 and the seventh subscriber device M7 from the active antenna array 1.

In one aspect of the present disclosure, the first radius $R_1$ may be chosen to correspond to a third of the actual cell radius R of the first cell sector 11.1 and the second radius $R_2$ may be chosen to correspond to two thirds of the actual cell radius R. However, these values are just examples and have to be chosen by a person skilled in the art according to the actual conditions of the cell.

As the first subscriber device M1 is within the far field area 43 the first tilt angle parameter 311 is assigned the value "0". As the second subscriber device M2 is within the middle field 42 the beam control device assigns the value "1" to the second tilt angle parameter 312. As the third subscriber device M3 is within the near field area 41 the third tilt angle parameter 313 is assigned the value "2", and so on. In the event, that a time slot is left empty, such as the sixth time slot 306 the tilt angle parameter may be set either to an arbitrary value, the value "0" as it corresponds to the value where the tilt angle is unaffected, or the tilt angle parameter is kept at the last value of the precedent tilt angle parameter 315 or to the tilt angle parameter 317 of the following time slot 307. The tilt angle parameters TA are transmitted to the active antenna array 1, for example embedded in other control data that is exchanged between active antenna array 1 and base station equipment rack 2. The tilt angle parameters TA are received and decoded in the active antenna array 1 and are used to electronically steer the tilt angle of the antenna beam, for both the transmit and receive beams, whilst the timeslot signals are transceived from the micro radios. As the first tilt angle parameter 311 of the first time slot 301 is "0" the radio beam is either not electronically tilted at all, in addition to its mechanical tilt, or set to its initial design value, based upon the original cell plan for that cell, and covers the full sector I of the first cell 11.1, as depicted in FIG. 2*b*. As the second tilt angle parameter is assigned the value "1" the radio beam is tilted to a small extent during the second time slot 302 and thereby produces a radiation pattern that covers only the near field area 41 and the middle field area 42. This radiation pattern is also depicted as the second radiation area II in FIG. 2*c*. For the third time slot 303 the tilt angle parameter was set to the value "2" and therefore the fully tilted radio beam covers only the near field area 41 which is depicted as the third radiation area III in FIG. 2*d*.

In a further aspect of the present disclosure the power level of the transmit signal in one or more of the time slots is modified by the beam control device 20. Usually for the time slots a power level is calculated by the base station controller. As this power level is calculated on the basis of a radio beam I that has not been tilted electronically in addition to its pre-fixed tilt angle, the power level for an electronically tilted radio beam is higher than the power level needs to be, as the same amount of power of the electronically tilted radio beam would be concentrated in a smaller area. In the steps of assigning the tilt angle parameter, the beam tilting device 20 also assigns a power modification factor that is transmitted to the active antenna array 1. By means of the power modification factors the transmit power level of the micro radio units in the active antenna array 1 is reduced accordingly. This power reduction further diminishes the signal interference. Although the signal interference is only reduced in time slots where the subscriber unit is not close to the cell sector boundary H-J-K, statistically the power reduction improves the interference situation in a cell 11, especially when this power reduction procedure is also applied in neighbouring cell sectors 11.2, 11.3.

In other mobile communications systems, the power reduction factor can be applied not on a time-slot basis, but by determining where one or a group of the subscriber units is located. The radio beam is preferentially directed to the subscriber unit (or the group of subscriber units) and the power of the radio beam is reduced such that the subscriber unit (or the group of subscriber units) receives the radio beam at adequate signal strength.

It will be appreciated that the power reduction might mean that when one of the subscriber units moves into one of the neighbouring cell sectors 11.1, 11.2, 11.3 from another one of the neighbouring cell sectors 11.1, 11.2 or 11.3 then the power reduction and/or the coverage area is reduced and the connection between the mobile communications system and the subscriber unit may be interrupted. A voice call from the subscriber unit, for example located near the cell boundary, might be dropped. This can be avoided by either proactively increasing the power when it is known that one of the mobile subscribers is moving towards another one of the neighbouring cell sectors 11.1, 11.2, 11.3 or by always maintaining a low level of power to at least detect the mobile subscriber on entering the neighbouring cell sector 11.1, 11.2 or 11.3.

The base transceiver station of the present disclosure may be used in so-called self-optimized networks (SON) to minimise transmit power and cell-to-cell interference through a lower "leakage" of power from one cell to the neighbouring cell. The time slot based adaptation of the antenna tilt angle has been described for the transmission of radio signals. However, the teachings of this disclosure can also be applied for tilting the antenna beam in the case of receiving signals in the uplink, i.e. signals sent by the subscriber devices. Switching the receive antenna beam minimises interference from an adjacent transmitter, i.e. a subscriber device in a neighbouring cell, and thereby improves system capacity and the subscriber's quality of service.

The present disclosure further relates to a computer program product embedded on a computer readable medium. The computer program product comprises executable instructions for the evaluation of the distances d of the subscriber devices and assigning of at least tilt angle parameters.

While various embodiments of the present invention have been described above, it should be understood that they have been presented by way of example, and not limitation. It will be apparent to persons skilled in the relevant arts that various changes in form and detail can be made therein without departing from the scope of the invention. Thus, the present invention should not be limited by any of the above-described exemplary embodiments, but should be defined only in accordance with the following claims and their equivalents.

In addition to using hardware (e.g., within or coupled to a Central Processing Unit ("GPU"), microprocessor, microcontroller, digital signal processor, processor core, System on chip ("SOG"), or any other device), implementations may also be embodied in software (e.g., computer readable code, program code, and/or instructions disposed in any form, such as source, object or machine language) disposed, for example, in a computer usable (e.g., readable) medium configured to store the software. Such software can enable, for example, the function, fabrication, modelling, simulation, description and/or testing of the apparatus and methods described herein. For example, this can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CO-ROM, OVO-ROM, etc.). The software can also be disposed as a computer data signal embodied in a computer usable (e.g., readable) transmission medium (e.g., carrier wave or any other medium including digital, optical, or analogue-based medium). Embodiments of the present invention may include methods of providing the apparatus described herein by providing software describing the apparatus and subsequently transmitting the software as a computer data signal over a communication network including the Internet and intranets. It is understood that the apparatus and method described herein may be included in a semiconductor intellectual property core, such as a microprocessor core (e.g., embodied in HOL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalents.

The invention claimed is:

1. A base transceiver station for a mobile communications network for communicating with a plurality of subscriber devices within a coverage area, comprising:
   an active antenna array, the active antenna array comprising a vertical tilt adaption arrangement adapted to electronically adjust a tilt angle of an antenna beam in dependence of beam tilting control data thereby dynamically change the coverage area served by the base transceiver station and reflect location of ones of the plurality of subscriber devices;
   a beam control device for evaluating the distance of the ones of the subscriber devices to the active antenna array and calculating from the distances the beam tilting control data, and
   wherein distance data that is used by the beam control device to evaluate the distance of the ones of the subscriber devices to the active antenna array is extracted from data which the base transceiver station is forwarding to other entities in the mobile communications network,
   wherein the beam control device is adapted to evaluate at least one of geo-location data received from the ones of the plurality of subscriber devices, round-trip delay data of signals to and from the ones of the plurality of subscriber devices, or positioning data received from the ones of the plurality of subscriber devices, and
   wherein the active antenna array is adapted to exchange payload signals and control signals with the base transceiver station in digital form.

2. The base transceiver station according to claim 1 wherein the antenna beam is an antenna beam for transmitting signals to the ones of the plurality of subscriber devices.

3. The base transceiver station according to claim 1 wherein the antenna beam is an antenna beam for receiving signals from the ones of the plurality of subscriber devices.

4. The base transceiver station according to claim 3 wherein the beam control device calculates power modification factors for reducing transmit power.

5. The base transceiver station according to claim 1 wherein radio signals are transceived in time slots and wherein the vertical tilt adaption arrangement generates the beam tilting control data for one or more of the time slots.

6. The base transceiver station according to claim 5 wherein the beam control device provides power reduction parameters for reducing the transmit power individually for the ones of the plurality of subscriber devices.

7. An active antenna array for a mobile communications network for communicating with a plurality of subscriber devices within a coverage area, the active antenna array comprising tilt adaption arrangements to electronically adjust a vertical tilt angle of an antenna beam in dependence of beam tilting control data, and thereby dynamically change the coverage area served by the active antenna array to reflect location of ones of the plurality of subscriber devices; wherein the active antenna array comprises an interface to receive beam tilting control data from a remote beam control device, the beam tilting control data being based on the distance of the ones of the subscriber devices to the active antenna array and calculating, from these distances, the beam tilting control data, and wherein distance data that is used by the beam control device to evaluate the distance of the ones of the subscriber devices to the active antenna array is extracted from data which the base transceiver station is forwarding to other entities in the mobile communications network and wherein the beam control device is adapted to evaluate at least one of geo-location data received from the ones of the plurality of subscriber devices, round-trip delay data of signals to and from the ones of the plurality of subscriber devices, or positioning data that is received from the ones of the plurality of subscriber devices, wherein the active antenna array is adapted to exchange payload signals and control signals with a base transceiver station in digital form.

8. The active antenna array of claim 7 wherein the active antenna array is an active antenna array comprising radio units for transceiving radio signals, wherein the beam control device is located in the active antenna array.

9. A chipset for a mobile communications network for communicating with a plurality of subscriber devices within a coverage area, comprising:
   a tilt adaption arrangement to electronically adjust a vertical tilt angle of an antenna beam in dependence of beam tilting control data, thereby dynamically changing the coverage area served by the base transceiver station to reflect location of ones of the plurality of subscriber devices;
   a beam control device for evaluating the distance of the ones of the subscriber devices to the active antenna array and calculating from the distances the beam tilting control data;
   wherein distance data that is used by the beam control device to evaluate the distance of the ones of the subscriber devices to the active antenna array is extracted from data which the base transceiver station is forwarding to other entities in the mobile communications network, wherein the active antenna array is adapted to exchange payload signals and control signals with a base transceiver station in digital form; and
   wherein the beam control device is adapted to evaluate at least one of geo-location data received from the ones of the plurality of subscriber devices, round-trip delay data of signals to and from the ones of the plurality of subscriber devices, or positioning data that is received from the ones of the plurality of subscriber devices.

10. Method for manufacturing a chipset for a base transceiver station for a mobile communications network for communicating with a plurality of subscriber devices within a coverage area comprising:
   electronically adjusting a vertical tilt angle of an antenna beam in dependence of beam tilting control data, and thereby dynamically changing the coverage area served by the base transceiver station to reflect location of ones of the plurality of subscriber devices;
   extracting distance data from data which the base transceiver station is forwarding to other entities in the mobile communications network
   evaluating the distance of the ones of the subscriber devices to the active antenna array based on the extracted distance data and calculating from the distances the beam tilting control data;
   evaluating at least one of geo-location data received from the ones of the plurality of subscriber devices, round-trip delay data of signals to and from the ones of the plurality of subscriber devices, or positioning data that is received from the ones of the plurality of subscriber devices,
   wherein the active antenna array is adapted to exchange payload signals and control signals with a base transceiver station in digital form.

11. A method for operating a base transceiver station for a mobile communications network for communicating with a plurality of subscriber devices within a coverage area via an active antenna array comprising
   collecting distance data from ones of the plurality of subscriber devices by extracting distance data from data which the base transceiver station is forwarding to ones of the plurality of subscriber devices in the mobile communications network by evaluating at least one of geolocation data received from the ones of the plurality of subscriber devices, round-trip delay data of signals to and from the ones of the plurality of subscriber devices, or positioning data that is received from the ones of the plurality of subscriber devices;

calculating the distance of ones of the plurality of subscriber devices to the active antenna array from the distance data;

calculating beam tilting control data based on the calculated distance of the ones of the plurality of subscriber devices; and adjusting a vertical tilt angle of an antenna beam in dependence of the beam tilting control data and thereby changing the coverage area to reflect location of the ones of the plurality of subscriber devices, exchanging payload signals and control signals between the active antenna array and the base transceiver station in digital form by fibre optic means.

12. The method for operating a base transceiver station of claim 11 further comprises calculating power modification factors for reducing transmit power of the antenna beam.

13. The method for operating a base transceiver station of claim 11 in a TDMA-system with a plurality of time slots, further comprising separately for ones of the plurality of time slots collecting distance data from ones of the plurality of subscriber devices;

calculating the distance of ones of the plurality of subscriber devices to the active antenna array from the distance data;

calculating beam tilting control data based on the calculated distance of the ones of the plurality of subscriber devices;

adjusting a vertical tilt angle of an antenna beam in dependence of the beam tilting control data, thereby changing the coverage area to reflect location of the ones of the plurality of subscriber devices; and exchanging payload signals and control signals between the active antenna array and the base transceiver station in digital form by fibre optic means.

* * * * *